(12) United States Patent
Walker et al.

(10) Patent No.: US 11,574,337 B1
(45) Date of Patent: Feb. 7, 2023

(54) SYSTEM FOR REDEEMING A GIFT VALUE FOR A GIFT PRODUCT AT A POINT-OF-SALE AND RELATED METHODS

(71) Applicant: Inmar Clearing, Inc., Winston-Salem, NC (US)

(72) Inventors: Jess D. Walker, Georgetown, TX (US); Andreas M. Benamou, Spicewood, TX (US); Gregory L. Kerr, Winston-Salem, NC (US); L. David Mounts, Winston-Salem, NC (US); Srinivasan Varadarajan, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 125 days.

(21) Appl. No.: 17/011,620

(22) Filed: Sep. 3, 2020

(51) Int. Cl.
| | |
|---|---|
| *G06Q 30/00* | (2012.01) |
| *G06Q 30/0238* | (2023.01) |
| *G06Q 20/32* | (2012.01) |
| *G06Q 30/0207* | (2023.01) |
| *G06Q 30/0234* | (2023.01) |

(52) U.S. Cl.
CPC ..... *G06Q 30/0238* (2013.01); *G06Q 20/3274* (2013.01); *G06Q 30/0234* (2013.01); *G06Q 30/0236* (2013.01)

(58) Field of Classification Search
CPC .................................................. G06Q 20/3274
See application file for complete search history.

(56) References Cited

U.S. PATENT DOCUMENTS

| | | | |
|---|---|---|---|
| 6,138,106 A | * | 10/2000 | Walker ............... G06Q 20/28 705/14.1 |
| 7,783,532 B2 | | 8/2010 | Hsu et al. |
| 2001/0014870 A1 | | 8/2001 | Saito et al. |

(Continued)

FOREIGN PATENT DOCUMENTS

WO WO-2013040696 A1 * 3/2013 ............. G06Q 20/20

OTHER PUBLICATIONS

Ollila, John, Marriott Gift Card 10% Purchase Bonus, Jul. 30, 2013, Loyalty Lobby, https://loyaltylobby.com/2013/07/30/marriott-gift-card-10-purchase-bonus/ (Year: 2013).*

(Continued)

*Primary Examiner* — Alvin L Brown
(74) *Attorney, Agent, or Firm* — Allen, Dyer, Doppelt + Gilchrist, P.A.

(57) ABSTRACT

A gift redemption system may include a gift processing server configured to accept a gift value for a gift product for a gift recipient, and permit selection of a retailer from among retailers for the gift product. The gift processing server may also be configured to associate a gift recipient identifier with the gift recipient, and permit selection of a redeemable gift value from the gift value. The system may also include a retailer server associated with the selected retailer. The system may also include a gift redemption server configured to obtain the redeemable gift value and the gift recipient identifier, and cooperate with retailer server to generate a gift discount identifier for use by the gift recipient at a point-of-sale (POS) of the gift product based upon the redeemable gift value and the gift recipient identifier.

22 Claims, 7 Drawing Sheets

(56) References Cited

U.S. PATENT DOCUMENTS

| | | |
|---|---|---|
| 2006/0053060 A1 | 3/2006 | Wyker et al. |
| 2007/0156513 A1 | 7/2007 | Mastrianni et al. |
| 2009/0182663 A1 | 7/2009 | Hurst |
| 2009/0327129 A1 | 12/2009 | Collas et al. |
| 2012/0136706 A1 | 5/2012 | Chang et al. |
| 2013/0006742 A1 | 1/2013 | Chard |
| 2013/0030901 A1 | 1/2013 | Eichstaedt et al. |
| 2013/0073369 A1 | 3/2013 | Begum |
| 2013/0073459 A1 | 3/2013 | Zacarias et al. |
| 2013/0191280 A1 | 7/2013 | Simonian |
| 2014/0129305 A1 | 5/2014 | Frame |
| 2014/0249904 A1 | 9/2014 | Nelsen et al. |
| 2014/0249986 A1 | 9/2014 | Wolfe et al. |
| 2015/0046240 A1 | 2/2015 | Moreton |
| 2015/0227956 A1 | 8/2015 | Mccowin |
| 2015/0269602 A1 | 9/2015 | Novick et al. |
| 2015/0332250 A1 | 11/2015 | Culwell |
| 2015/0356591 A1 | 12/2015 | Fano et al. |
| 2017/0083959 A1 | 3/2017 | Bousis et al. |
| 2017/0091801 A1* | 3/2017 | Rothberg ............... G06Q 40/02 |
| 2017/0193503 A1 | 7/2017 | Oppenheim |
| 2017/0228760 A1* | 8/2017 | Mason-Gugenheim .................... G06Q 20/3276 |
| 2018/0025401 A1* | 1/2018 | Suhadolnik ........ G06Q 30/0601 705/26.35 |

OTHER PUBLICATIONS

Walker et al., U.S. Appl. No. 16/011,921, filed Jun. 19, 2019.
Walker et al., U.S. Appl. No. 17/011,669, filed Sep. 3, 2020.

* cited by examiner

SYSTEM FOR REDEEMING A GIFT VALUE FOR A GIFT PRODUCT AT A POINT-OF-SALE AND RELATED METHODS

TECHNICAL FIELD

The present invention relates to the field of electronics, and more particularly, to the gift processing and redemption and related methods.

BACKGROUND

Crowdfunding is the raising of money or funds, typically smaller amounts, from a large number of people, and typically for a common cause or venture. One way of crowdfunding includes the use of the Internet whereby funders may provide funding through a web interface, for example.

A gift registry is a form of list whereby a person lists or provides desired items for others to purchase. The gift registry, which is typically in electronic form, permits others to view the items on the list as well as mark off items that are purchased, and see what others have already purchased.

A form of marketing is a coupon, typically in paper form, and provides a discount toward a product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A typical coupon is applicable to a given product and has a redeemable value that may vary based upon the quantity of a given item, size of the product in terms of packaging, and/or the price point of the given item, for example. U.S. Patent Application Publication No. 2013/0073369 to Begum discloses products of a particular brand using a redemption bank, which can be used by the consumer as a credit toward the purchase of one or more products of the particular brand.

SUMMARY

A gift redemption system may include a gift processing server configured to accept a gift value for a gift product for a gift recipient, and permit selection of a retailer from among a plurality of retailers for the gift product. The gift processing server may also be configured to associate a gift recipient identifier with the gift recipient, and permit selection of a redeemable gift value from the gift value. The system may also include a retailer server associated with the selected retailer. The gift redemption system may further include a gift redemption server configured to obtain the redeemable gift value and the gift recipient identifier, and cooperate with the retailer server to generate a gift discount identifier for use by the gift recipient at a point-of-sale (POS) of the gift product based upon the redeemable gift value and the gift recipient identifier.

The gift redemption server may be configured to generate the gift discount identifier based upon the gift product being purchased at the POS, for example. The gift product may have a gift product identifier associated therewith, and the gift redemption server may be configured to cooperate with the POS to obtain a purchased product identifier and generate the gift discount identifier based upon a match between the gift product identifier and the purchased product identifier. The gift product identifier and the purchased product identifier may each include a uniform product code (UPC).

The gift redemption system may also include a gift recipient device, for example. The gift redemption server may be configured to communicate the gift discount identifier to the gift recipient device. The gift recipient device may be configured to display the gift discount identifier thereon for input at the POS, for example. The gift recipient device may include a mobile wireless communications device, for example.

The gift redemption server may be configured to cooperate with the retailer server to apply the redeemable gift value to a purchase price of the gift product based upon the gift discount identifier. The gift discount identifier may include a machine-readable code.

A method aspect is directed to a method of redeeming a gift. The method may include using a gift redemption server to obtain a redeemable gift value from a gift value and a gift recipient identifier from a gift processing server. The gift processing server may be used to accept the gift value for a gift product for a gift recipient, permit selection of a retailer from among a plurality of retailers for the gift product, associate a gift recipient identifier with the gift recipient, and permit selection of the redeemable gift value from the gift value. The method may also include using the gift redemption server to cooperate with a retailer server to generate a gift discount identifier for use by the gift recipient at a point-of-sale (POS) of the gift product based upon the redeemable gift value and the gift recipient identifier.

A computer readable medium aspect is directed to a non-transitory computer readable medium for redeeming a gift. The non-transitory computer readable medium includes computer executable instructions that when executed by a processor of a gift redemption server cause the processor to perform operations. The operations may include obtaining a redeemable gift value from a gift value, and a gift recipient identifier from a gift processing server. The gift processing server may be configured to accept the gift value for a gift product for a gift recipient, permit selection of a retailer from among a plurality of retailers for the gift product, associate a gift recipient identifier with the gift recipient, and permit selection of the redeemable gift value from the gift value. The operations may also include cooperating with a retailer server to generate a gift discount identifier for use by the gift recipient at a point-of-sale (POS) of the gift product based upon the redeemable gift value and the gift recipient identifier.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
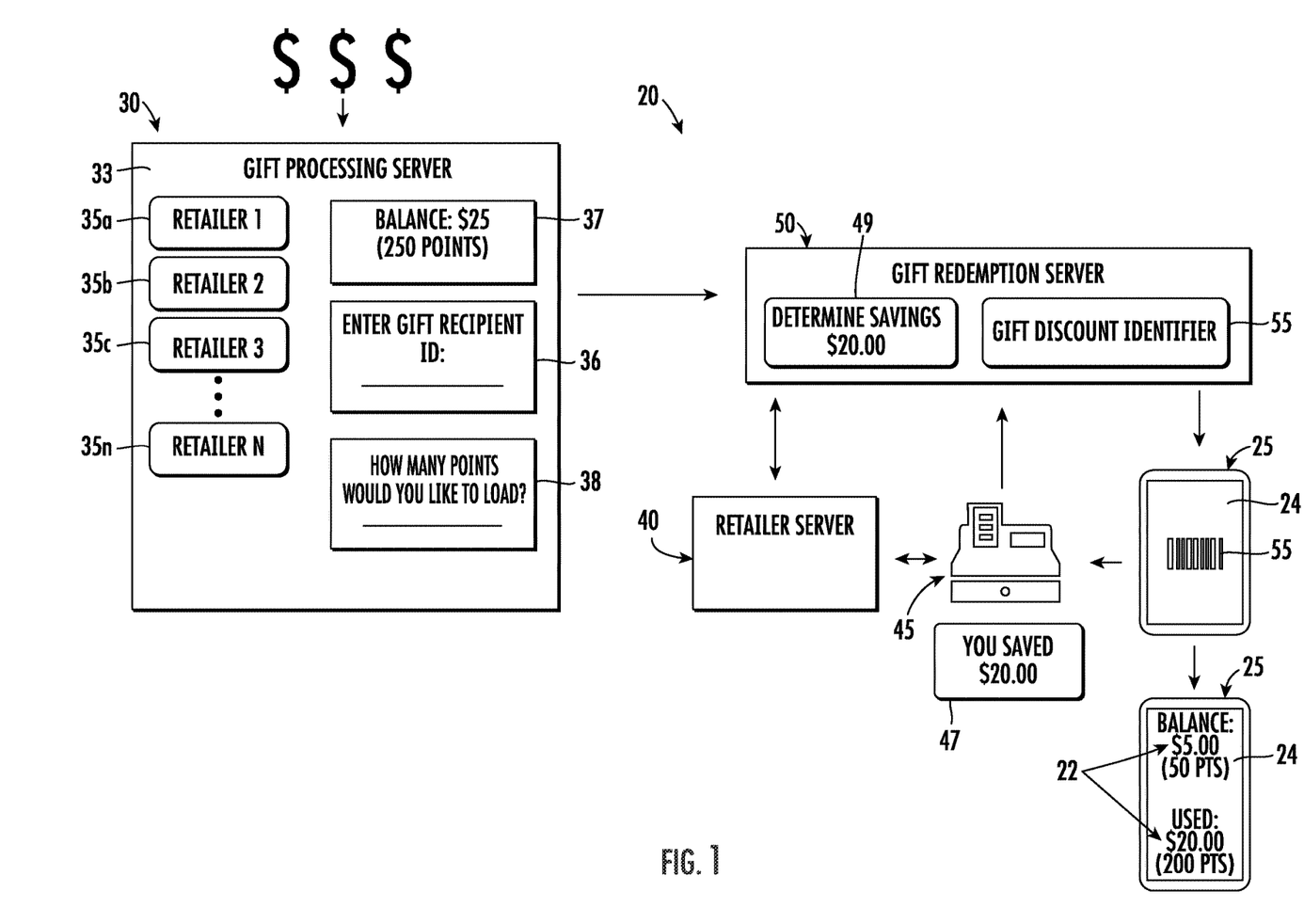
FIG. 1 is a schematic diagram of a gift redemption system according to an embodiment.
Figure 2:
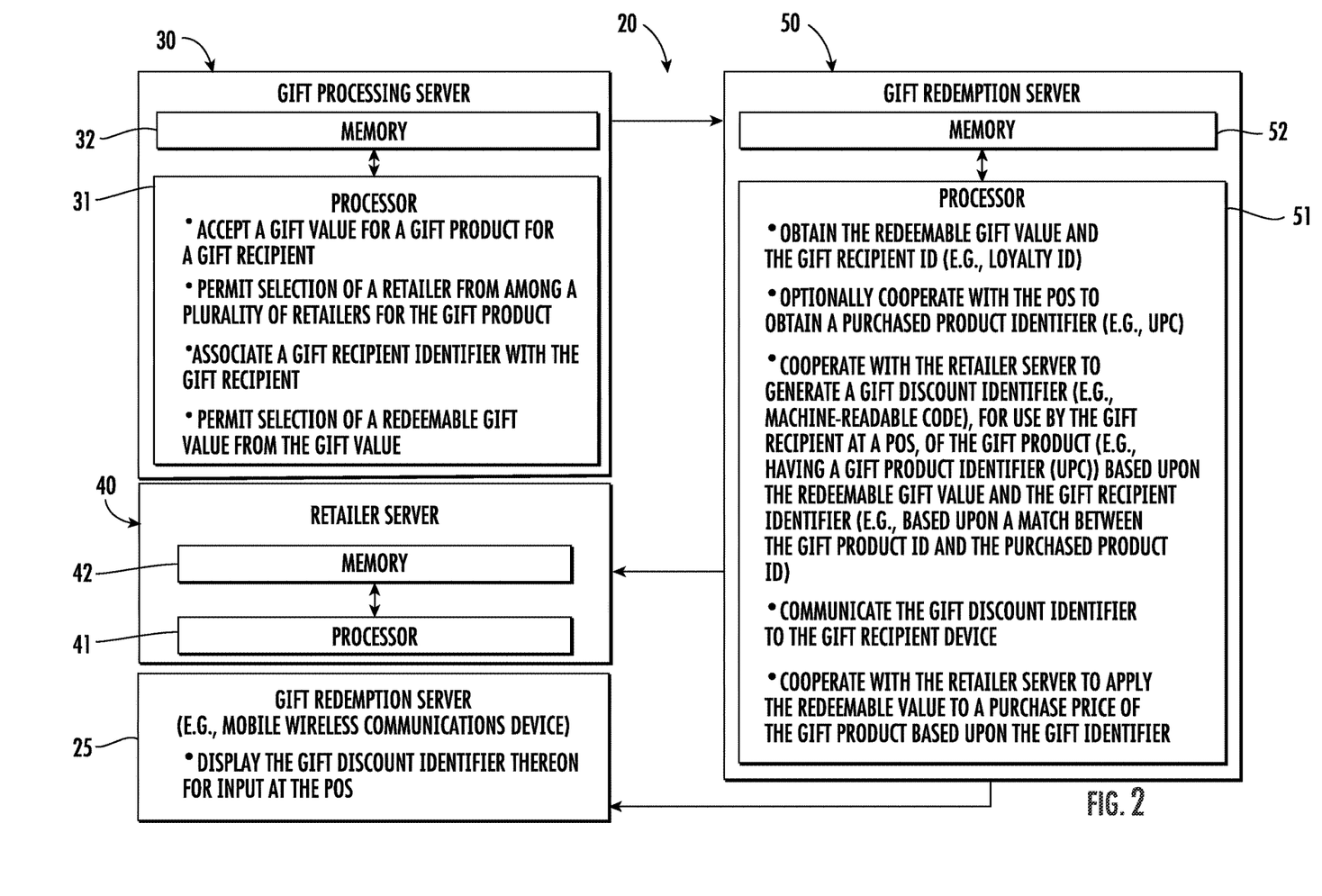
FIG. 2 is a schematic block diagram of the gift redemption system of FIG. 1.

Referring initially to FIGS. 1 and 2, a system for redeeming a gift 20 illustratively includes a gift processing server 30. The gift processing server 30 includes a processor 31 and an associated memory 32. While operations of the gift processing server 30 are described herein, it will be appreciated that the operations are performed though cooperation of the processor 31 and the memory 32.

The gift processing server 30, for example, via an interface, accepts a gift value for a gift product for a gift recipient. For example, a gift giver may gift a gift value, which may be a monetary or cash value to the gift recipient for use toward the gift product. The gift product may be associated with a particular brand of item. The gift processing server 30 may be associated with the brand, for example, operated by the brand. Conceptually, the gift processing server 30 may be considered to operate a crowd-funded registry for the gift recipient and, in some embodiments, for a particular brand of goods. In some embodiments, one or more brands, retailers, or manufacturers may supply or provide the gift value. Companies and/or employees, for example, may provide the gift value in some embodiments. Still further, the gift processing server 30 may operate in a peer-to-peer fashion to obtain the gift value. Of course, the gift processing server 30 may implement other and/or additional arrangements for sourcing the gift value. In an exemplary implementation, the gift processing server 30 may accept a gift value, for example, $25, usable toward Brand-X Diapers by the gift recipient.

In another exemplary embodiment, the gift processing server 30 may be associated with a governmental agency so that the governmental agency may provide the gift value usable toward the purchase of one or more gift products and/or services, such as, for example, foods having a threshold nutritional value, and/or supplies or products, such as baby products, storm preparation and cleanup supplies, and/or pandemic relief and safety supplies. In another exemplary embodiment, the gift processing server 30 may be associated with an employer, the gift recipient may be an employee, and the gift product may also include food having a threshold nutritional value and/or other product or service considered to encourage a healthy lifestyle. For example, the gift value may be usable toward health club memberships, sporting equipment, and/or other personal care items in addition to healthy food products.

The gift processing server 30 also permits selection of a retailer from among retailers for the gift product. More particularly, the gift processing server 30 provides an interface 33, for example, via a display, so that the gift recipient may choose a desired retailer 35a-35n for redemption and notified of the gift value balance 37, as will be described in further detail below. For example, if the gift recipient prefers Retailer-1 35a from among Retailers 1-N 35a-35n, the gift recipient would select Retailer-1 so that the gift value 38 is redeemable at Retailer-1. Of course, the gift recipient may choose another retailer or combination of retailers for redemption.

The gift processing server 30 associates a gift recipient identifier 36 with the gift recipient. The gift recipient identifier 36 may be a loyalty account identifier, for example, a username, phone number, or email address, associated with the selected retailer. The gift recipient identifier 36 may be another identifier to identify the gift recipient. The gift recipient may enter, for example, via the interface 33, the gift recipient identifier. In some embodiments, the gift recipient identifier 36 may be associated using other techniques, for example outside of the interface 33 and/or without the gift recipient's entry.

The gift processing server 30 also permits selection of a redeemable gift value from the gift value 38. For example, the gift recipient may choose to redeem $20 of the $25 gift value. As will be appreciated by those skilled in the art, the gift recipient may select different redeemable values for use at different retailers.

The system 20 also includes a retailer server 40 associated with the selected retailer. The retailer server 40 includes a processor 41 and an associated memory 42. While operations of the retailer server 40 are described herein, it will be appreciated that the operations are performed though cooperation of the processor 41 and the memory 42. The retailer server 40 may include or cooperate with a point-of-sale (POS) device or terminal 45 at a point-of-sale at the retailer location for processing products for purchase (e.g., scanning of the products and processing of payment).

The system 20 also includes a gift redemption server 50. The gift redemption server 50 includes a processor 51 and an associated memory 52. While operations of the gift redemption server 50 are described herein, it will be appreciated that the operations are performed though cooperation of the processor 51 and the memory 52. Referring now to the flowchart 60 in FIG. 3, operations of the gift redemption server 50 will now be described.

Figure 3:
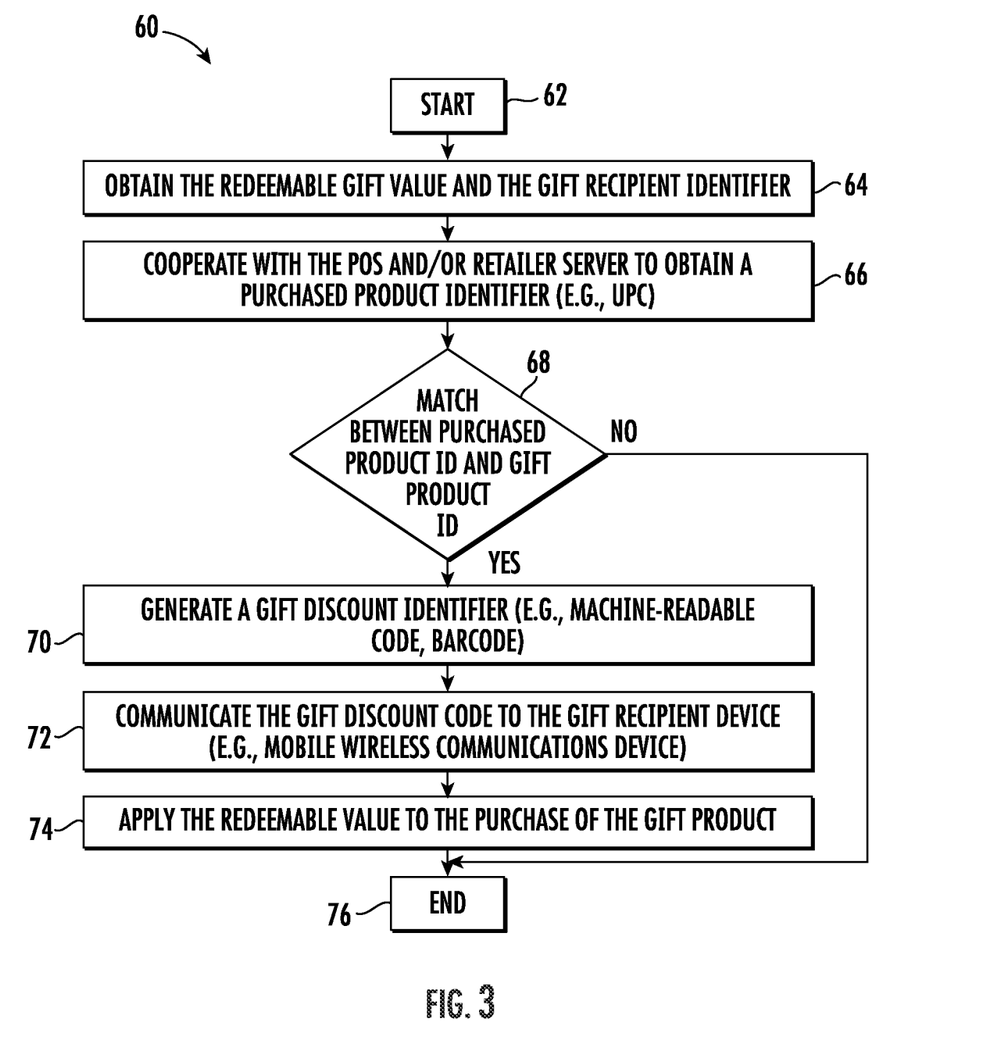
FIG. 3 is a flow diagram of operation of the gift redemption server of FIG. 2.

Beginning at Block 62, the gift redemption server 50 obtains the redeemable gift value and the gift recipient identifier 36 (Block 64). The gift redemption server 50 cooperates with the retailer server 40 to generate a gift discount identifier for use by the gift recipient at the POS terminal 45 of the gift product based upon the redeemable gift value and the gift recipient identifier 36. More particularly, the gift redemption server 50 generates the gift discount identifier based upon the gift product being purchased at the POS terminal 45, as will be described in further detail below.

The gift product has a gift product identifier associated therewith, for example, a uniform product code (UPC) or family of UPCs. At Block 66, the gift processing server 50 cooperates with the POS terminal 45 and/or retailer server 40 to obtain a purchased product identifier (e.g., also a UPC or family of UPCs), for example, UPCs of products being scanned or purchased during a checkout process at the retailer. The gift redemption server 50 determines a match, at Block 68, between the gift product identifier and the purchased product identifier. When there is a match, at Block 68, the gift redemption server 50 generates the gift discount identifier (i.e., based upon the match) that corresponds to the redeemable gift value or savings 49 (Block 70). The gift product identifier and the purchased product identifier each may include other and/or additional types of codes, such as, for example, price look up (PLU) code, stock keeping unit (SKU), etc. If there is not match, at Block 68, operations end at Block 76.

The gift discount identifier 55 may be in the form of a machine-readable code, for example, a barcode or quick-response (QR) code. The gift redemption server 50 may communicate the gift discount identifier 55 to a gift recipient device 25, which may be in the form of a mobile wireless communications device, such as a mobile phone, tablet, or other computing device (Block 72). The gift recipient device 25 may, upon receipt of the gift discount identifier 55, display the gift discount identifier thereon for input at the POS terminal 45.

The gift recipient, upon redemption of the gift value for the gift product, may present the gift discount identifier 55 at the POS terminal 45 for scanning or entry of the gift discount identifier so that the redeemable gift value 49 is applied to the purchase of the gift product (Block 74). In some embodiments, for example, where the gift discount identifier 55 is displayed on the display 24 of the gift recipient device 25, the gift recipient may present the gift recipient device at the POS terminal 45 for scanning of the gift discount identifier or barcode. In an embodiment, the gift recipient device 25 may wirelessly communicate the gift discount identifier 55 to the POS terminal 45, for example, via near-field communications (NFC) or other short-range communications protocol.

The POS terminal 45 and retailer server 40 cooperate to apply the redeemable value to the purchase of the gift product. For example, the redeemable value may be applied as a discount to the purchase price of the gift product or a credit to the purchase 47.

In some embodiments, the retailer server 40 and/or the POS terminal 45 may communicate with the gift redemption server 50 to validate the purchase transaction prior to application of the redeemable gift value 49. For example, the gift redemption server 50, based upon the gift recipient identifier 36 (e.g., loyalty account identifier), may verify the gift value 38 or available value and whether the gift product was actually purchased. The gift redemption server 50 may also cooperate with the gift processing server 30 to update the account or amount of redeemable gift value 49 from the gift value 38 (i.e., debit the account). In some embodiments, the gift redemption server 50 may perform the accounting functions associated with the gift value and redeemable gift value 49 (i.e., adding or debiting value, maintaining a database of associated with the gift product).

The gift redemption server 50 may also communicate, for example, wirelessly, a notification 22 to the gift recipient device 25. The notification 22 may include a confirmation that the redeemable gift value 49 was redeemed at the selected retailer toward the gift product. The notification 22 may also include a remaining gift value 38 after redemption of the redeemable gift value 49. Operations end at Block 76.

In some embodiments, the gift value 38 may be converted to redeemable points. The redeemable points may be redeemed or used similarly to the process described above. When the gift product is associated with a brand and/or when the gift processing server 30 is associated with a brand, as described above, the gift redemption server 50 may generate a promotion (e.g., a coupon or rebate), usable or redeemable toward the purchase of the gift product of the particular brand. The promotion may be generated similarly to the gift discount identifier 55 and has a promotional value associated therewith. The promotion may be in the form of gift value added to the redeemable gift value 49 so that the gift discount identifier 55 is based upon the redeemable gift value and the promotional value.

In some embodiments, the promotional value of the promotion may be increased based upon a number of gift products of the brand for which gift values are accepted (i.e., the number of brand items in the gift recipient registry). The promotional value of the promotion may also be increased based upon a number or amount of accepted gifts (e.g., the more gift givers, the more the promotional value). The promotional value may also be increased based upon an aggregate amount of gift value (e.g., how much value of funds have been accepted toward the gift product). In some embodiments, the promotion itself may be based upon or contingent upon a threshold level of gift value or amount of gift givers. In embodiments where the gift value is converted to or in the form of redeemable points, the gift redemption server 50 may add points associated with the gift recipient.

In an embodiment, for example, whereby the gift recipient has already purchased the gift product, the gift processing server 30 may obtain an image of the associated receipt and perform an optical character recognition (OCR). Based upon the OCR of the receipt, the gift processing server 30 may cooperate with the gift redemption server 50 to verify or validate the purchase of the gift product at any retailer based upon the gift recipient identifier 36. The gift value 38, and more particularly, the selected redeemable gift value 49, may then be provided to the gift recipient in the form of a check, electronic funds transfer, credit at any retailer, or credit at a selected retailer, for example, deposited within the gift recipient's loyalty account. Of course, the selected redeemable gift value may be distributed to the gift recipient in other and/or additional ways.

While a gift product has generally been described herein, those skilled in the art will appreciate that the gift processing server 30 may accept gift values for more than one gift product. Functions of the gift processing server 30 may be combined or shared with the functions of the gift redemption server 50. As will be appreciated by those skilled in the art, the system 20 described herein may be particularly advantageous in that it permits acceptance of gift values toward one or more gift products from multiple gift givers, the gift values being selectively usable at any selected retailer or retailers from among different retails. Those of skill in the art will also recognize that the gift product may be a service or have a service component associated with a physical gift product.

A method aspect is directed to a method of redeeming a gift. The method includes using a gift redemption server 50 to obtain a redeemable gift value 49 from a gift value 38 and a gift recipient identifier 36 from a gift processing server 30. The gift processing server 30 is configured to accept the gift value for a gift product for a gift recipient, permit selection of a retailer from among a plurality of retailers for the gift product, associate a gift recipient identifier 36 with the gift recipient, and permit selection of the redeemable gift value 49 from the gift value 38. The method also includes using the gift redemption server 50 to cooperate with a retailer server 40 to generate a gift discount identifier 55 for use by the gift recipient at a POS terminal 45 of the gift product based upon the redeemable gift value 49 and the gift recipient identifier 36.

A computer readable medium aspect is directed to a non-transitory computer readable medium for redeeming a gift. The non-transitory computer readable medium includes computer executable instructions that when executed by a processor 51 of a gift redemption server 50 cause the processor to perform operations. The operations include obtaining a redeemable gift value 49 from a gift value 38 and a gift recipient identifier 36 from a gift processing server 30. The gift processing server 30 is configured to accept the gift value for a gift product for a gift recipient, permit selection of a retailer from among a plurality of retailers for the gift product, associate a gift recipient identifier 36 with the gift recipient, and permit selection of the redeemable gift value 49 from the gift value 38. The operations also include cooperating with a retailer server 40 to generate a gift discount identifier 55 for use by the gift recipient at a POS terminal 45 of the gift product based upon the redeemable gift value 49 and the gift recipient identifier 36.

Figure 4:
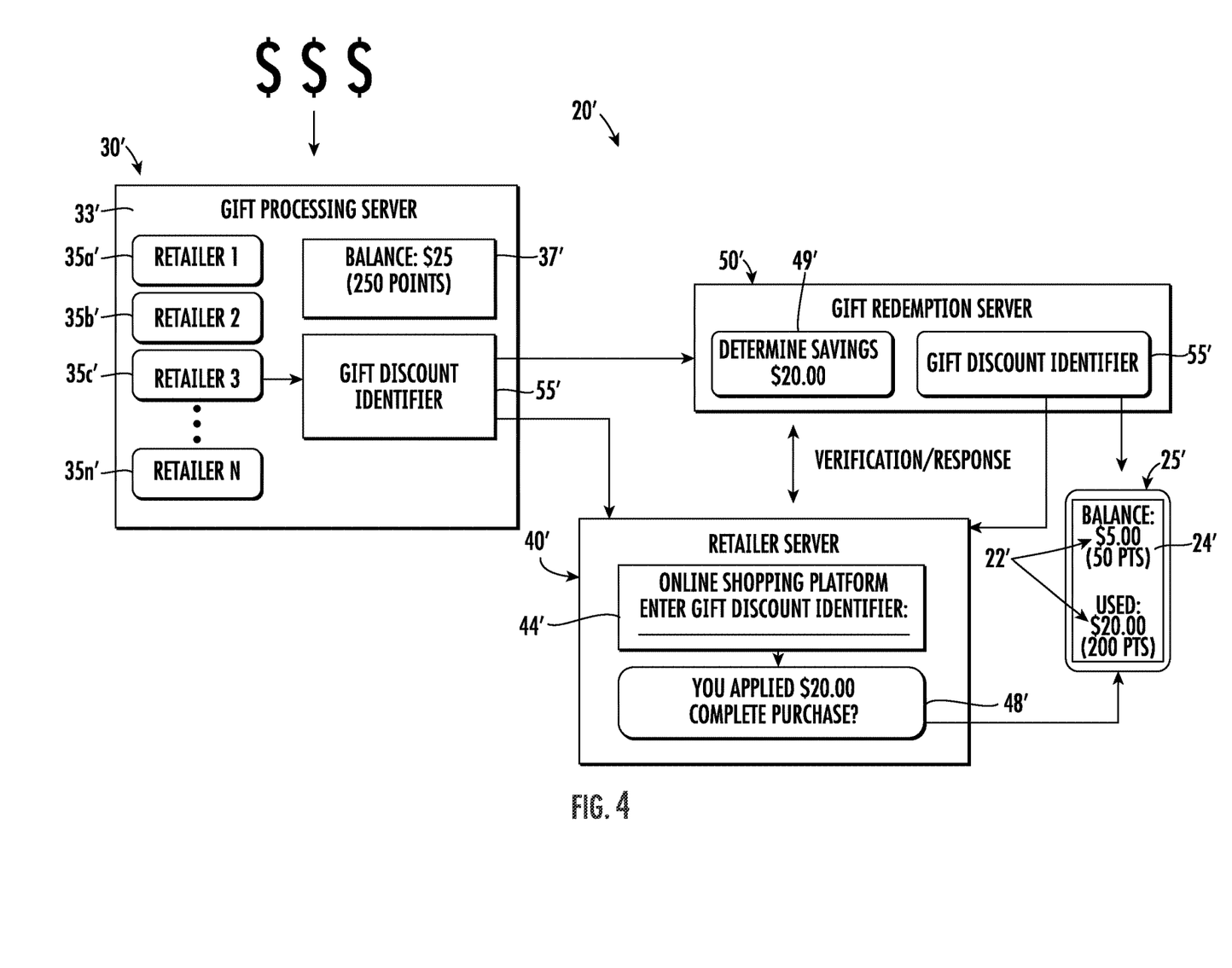
FIG. 4 is a schematic diagram of a gift redemption system in accordance with another embodiment.
Figure 5:
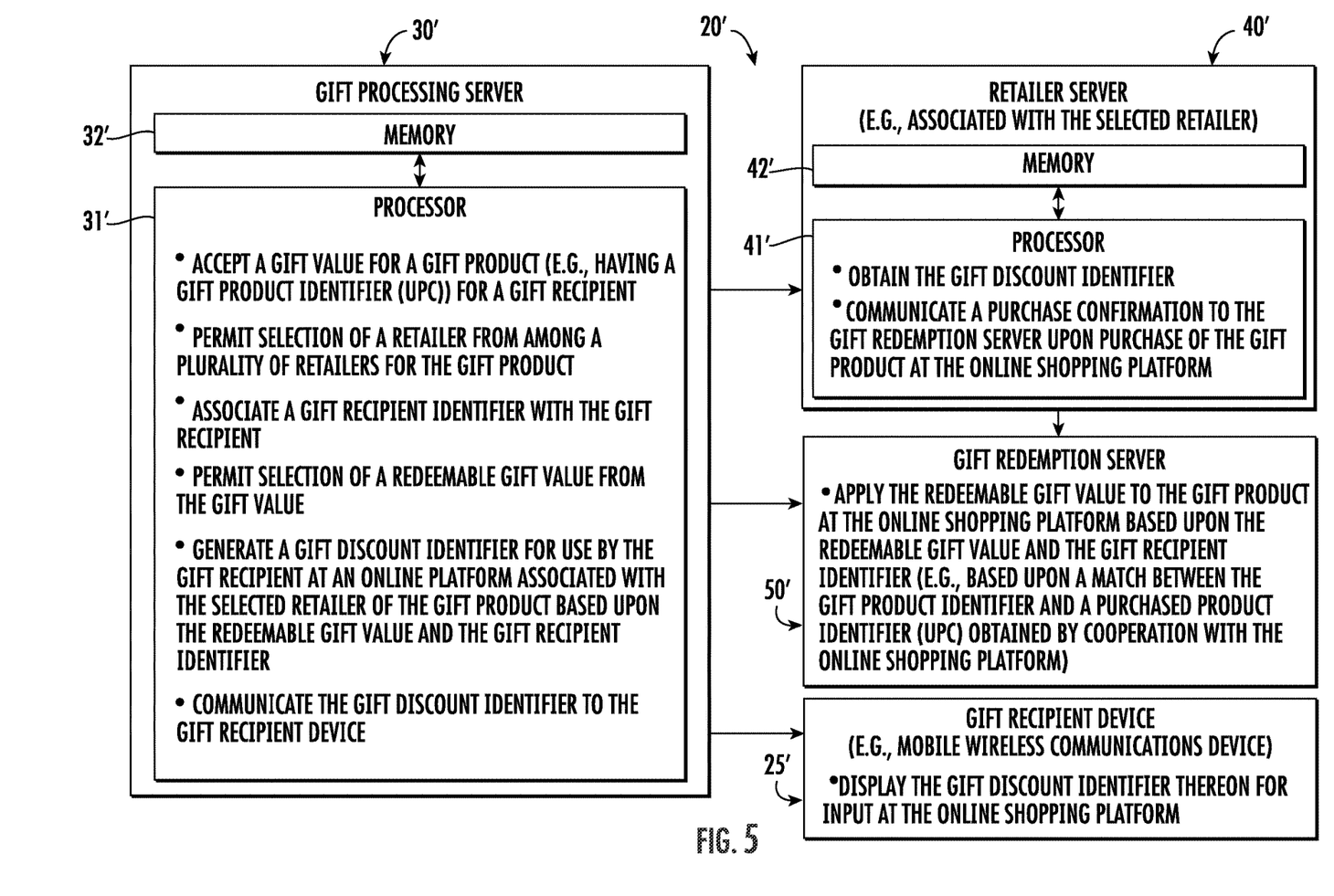
FIG. 5 is a schematic block diagram of the gift redemption system of the FIG. 4.
Figure 6:
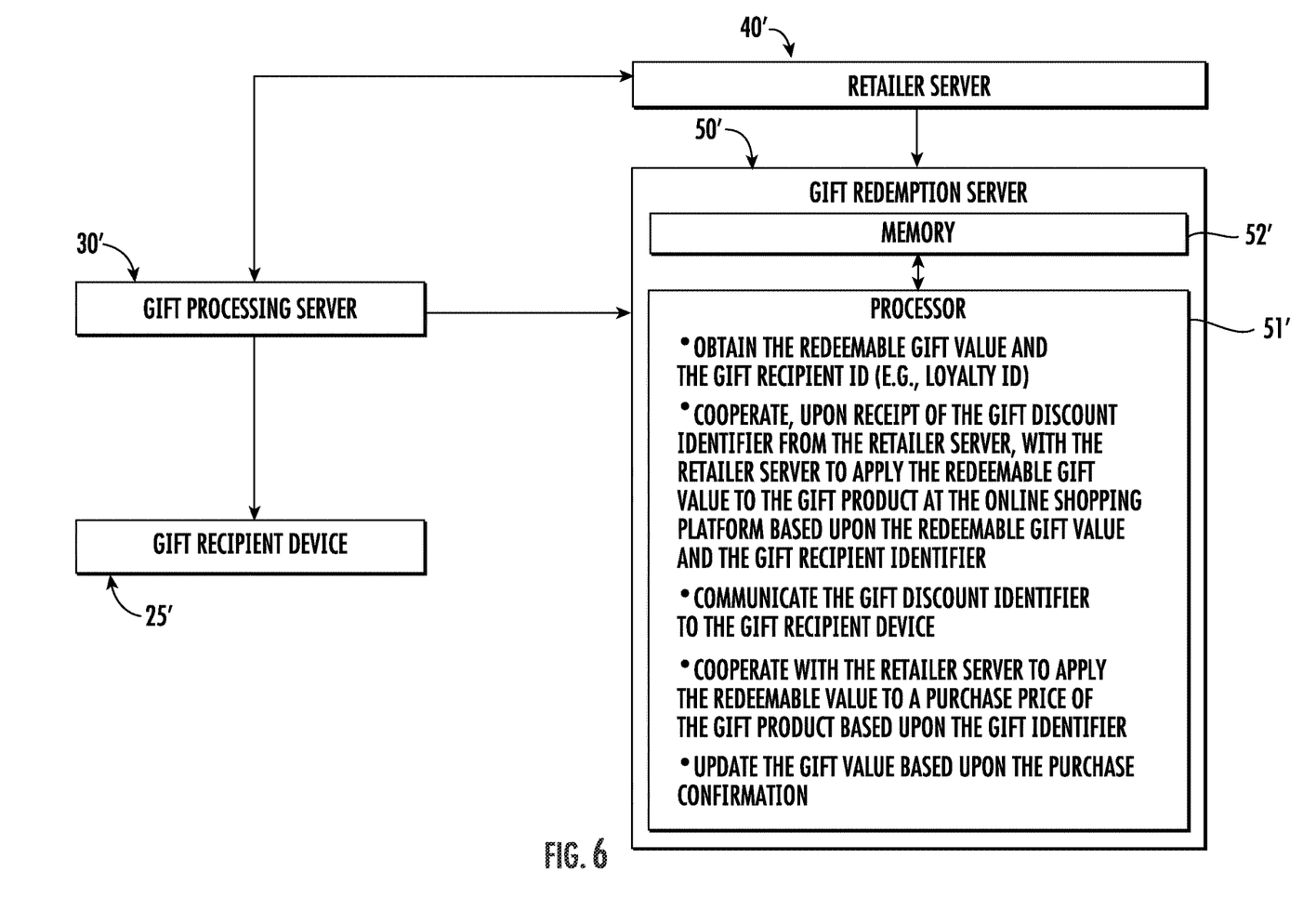
FIG. 6 is another schematic block diagram of a gift redemption system of FIG. 4.

Referring now to FIGS. 4-6, in another embodiment of the system 20', the gift processing server 30', which includes a processor 31' and an associated memory 32', accepts a gift value for a gift product for a gift recipient, and permits selection of a retailer from among a plurality of retailers 35a'-35n' for the gift product. The gift processing server 30' also associates a gift recipient identifier 36', for example, a user identifier (ID) with the gift recipient, and permits selection of a redeemable gift value 49 from the gift value 38. These functions of the gift processing server 30' are similar to those described in the above embodiments.

However, differently from the above embodiments, the gift processing server 30' generates a gift discount identifier 55' for use by the gift recipient at an online shopping platform associated with the selected retailer of the gift product based upon the redeemable gift value 49' and the gift recipient identifier 36'. The online shopping platform may be an e-commerce website associated with the selected retailer 35a'-35n'. The gift recipient identifier 36' may be a username associated with the online shopping platform or another identifier, for example, associated with the gift processing server 30', as will be appreciated by those skilled in the art.

The gift discount identifier 55' is illustratively in the form of a promotional code, for example, an alphanumeric code. The gift discount identifier 55' may be unique to the gift recipient, such that it identifies or is associated with the selected retailer 35a'-35n' and the redeemable gift value 49'.

The gift processing server 30' may communicate, for example, wirelessly, the gift discount identifier 55' to a gift recipient device 25' that is illustratively in the form of a mobile wireless communications device. Of course, the gift recipient device 25' may be in the form of another type of device. The gift recipient device 25' may display the gift discount identifier 55' on a display 24' for entry or input at the online shopping platform 44' as will be described in further detail below. In some embodiments, the gift processing server 30' may communicate the gift discount identifier 55' in the form of an email or short-messaging-service (SMS) message.

A retailer server 40' is associated with the selected retailer 35a'-35n'. The retailer server 40' includes a processor 41' and an associated memory 42' and may operate the online shopping platform 44', for example. The retailer server 40' may obtain the gift discount identifier 55', for example, from the gift processing server 30'. In some embodiments, the retailer server 40' may obtain the gift discount identifier from a gift redemption server 50'.

The system 20' also includes a gift redemption server 50'. The gift redemption server 50' includes a processor 51' and an associated memory 52'.

Figure 7:
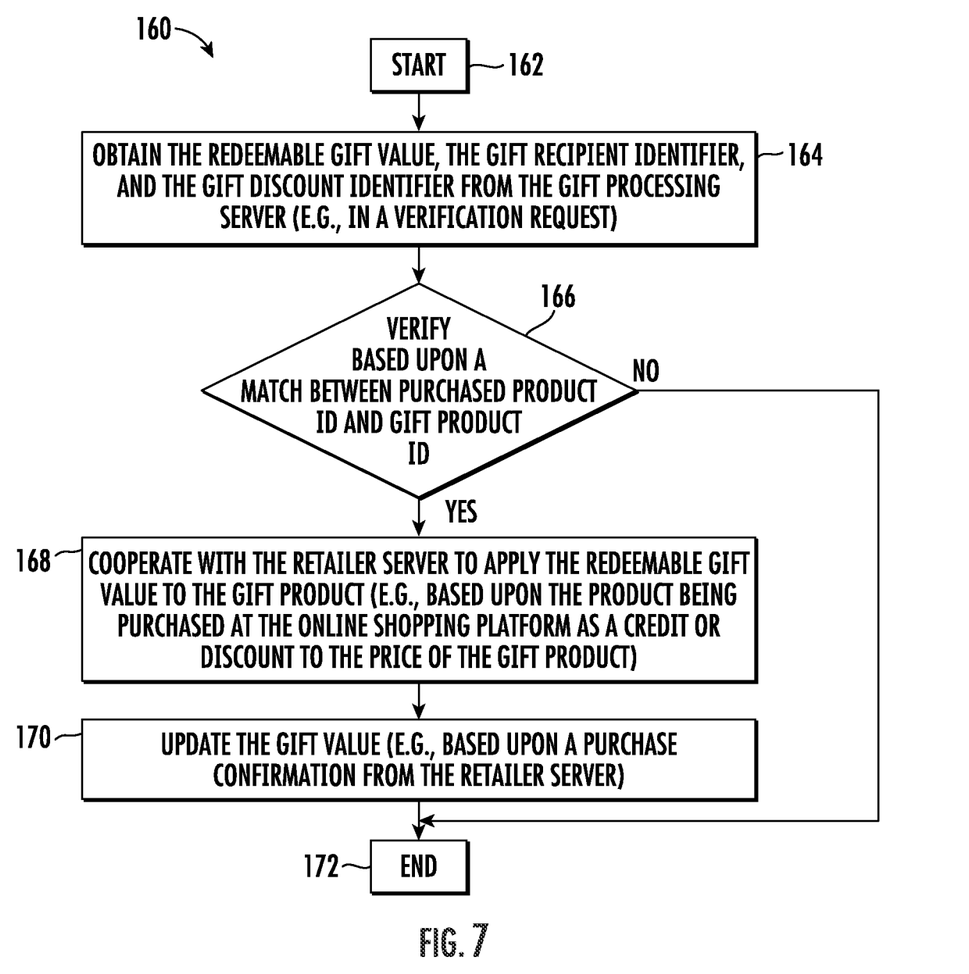
FIG. 7 is a flow diagram of operation of the gift redemption server of FIG. 6.

Referring now to the flowchart 160 in FIG. 7, beginning at Block 162, operations of the gift redemption server 50' will now be described. The gift redemption server 50' obtains, for example, via the Internet, the redeemable gift value 49', the gift recipient identifier 36', and the gift discount identifier 55' from the gift processing server 30' (Block 164). In an embodiment, the gift redemption server 50' may communicate the gift discount identifier 55' to the gift recipient device 25'.

The gift redemption server 50' cooperates, upon receipt of the gift discount identifier 55' from the retailer server 40', with the retailer server to apply the redeemable gift value 49' to the gift product at the online shopping platform 44' based upon the redeemable gift value and the gift recipient identifier 36'. More particularly, the gift recipient may shop the online shopping platform 44' for the gift product. The gift recipient, as part of the shopping process on the online shopping platform 44', may add the gift product to a virtual shopping cart operated by the online shopping platform. The gift product has a gift product identifier associated therewith, for example, a UPC code. As described above, the gift product identifier may be another type of identifier, for example, a SKU, PLU, or other identifier.

Once the gift recipient is desirous of checking out, i.e., purchasing the products in the virtual shopping cart, the gift recipient may be begin a checkout process. As part of the checkout process, the gift recipient may be prompted to enter a coupon or promotion code. The gift recipient supplies the gift discount code or gift discount identifier 55' as prompted to apply the redeemable gift value.

The gift redemption server 50' receives a verification request from the retailer server 40' that includes the gift discount identifier 55', the gift recipient identifier 36', the redeemable gift value 49' and a purchased product identifier (i.e., product identifiers of products in the virtual shopping cart). The gift redemption server 50' validates the gift discount identifier 55' based upon a match of the purchased product identifier and the gift product identifier (Block 166). The gift redemption server 50' may also verify or determine the validity of the gift discount identifier 55' with respect to there being enough gift value as part of the verification (i.e., the redeemable gift value 49' is less than or equal to the gift value).

The gift redemption server 50' may also receive the price being paid for the gift product by the gift recipient at the online shopping platform 44'. If at Block 166, the gift redemption server 50' verifies the request from the retail server 40', the gift redemption server may provide a response to the retail server indicating the request has been validated. If at Block 166, the request cannot be verified, operations end at Block 172.

At Block 168, after verification, the gift redemption server 50' cooperates with the retailer server 40' to apply the redeemable gift value 49' to the gift product. More particularly, the gift redemption server 50' applies the redeemable value to the gift product at the online shopping platform upon the gift product being purchased. The redeemable gift value 49' may be applied as a discount or credit to the price of the gift product, for example.

The retailer server 40' upon completion of the purchase of the gift product (e.g., successful application of the redeemable gift value 49'), may communicate a purchase confirmation 48' to the gift redemption server 50'. The gift redemption server 50', at Block 170, cooperates with the gift processing server 30' to update the gift value based upon the purchase confirmation, for example, to debit the gift value by the redeemable gift value 49'. In other words, the gift redemption server 50' performs settlement services.

The gift processing server 30' may display, via an interface 33', an updated gift value after redemption of the gift redeemable value. In some embodiments, the gift processing server 30' may communicate to the gift recipient device 25' a notification 22' for display thereon that includes the updated gift value and the last transaction or purchase, for example, including the redeemable gift value 49' applied to the gift product. Operations end at Block 172.

In some embodiments, the gift value may be converted to redeemable points. The redeemable points may be redeemed or used similarly the process described above. When the gift product is associated with a brand and/or when the gift processing server 30' is associated with a brand, as described above, the gift redemption server 50' may generate a promotion (e.g., a coupon or rebate), usable or redeemable toward the purchase of the gift product of the particular brand. The promotion may be generated similarly to the gift discount identifier and has a promotional value associated therewith. The promotion may be in the form of gift value added to the redeemable gift value so that the gift discount identifier is based upon the redeemable gift value and the promotional value. In an embodiment, the promotional value may be added to the redeemable gift value and associated with the gift discount identifier so that the gift discount identifier has a value that is equal to the redeemable fit value and the promotional value.

In some embodiments, the promotional value of the promotion may be increased based upon a number of gift products of the brand for which gift values are accepted (i.e., the number of brand items in the gift recipient registry). The promotional value of the promotion may also be increased based upon a number or amount of accepted gifts (e.g., the more gift givers, the more the promotional value). The promotional value may also be increased based upon an aggregate amount of gift value (e.g., how much value of funds have been accepted toward the gift product). In some embodiments, the promotion itself may be based upon or contingent upon a threshold level of gift value or amount of gift givers. In embodiments where the gift value is converted to or in the form of redeemable points, the gift redemption server 50' may add points associated with the gift recipient.

In an embodiment, for example, whereby the gift recipient has already purchased the gift product, the gift processing server 30' may obtain an image of the associated receipt and perform an OCR. Based upon the OCR of the receipt, the gift processing server 30' may cooperate with the gift redemption server 50' to verify or validate the purchase of the gift product at any retailer based upon the gift recipient identifier 36'. The gift value, and more particularly, the selected redeemable gift value 49', may then be provided to the gift recipient in the form of a check, electronic funds transfer, credit for use any retailer, credit at a selected retailer, for example, deposited within the gift recipient's loyalty account. Of course, the selected redeemable gift value may be distributed to the gift recipient in other and/or additional ways.

While a gift product has generally been described herein, those skilled in the art will appreciate that the gift processing server 30 may accept gift values for more than one gift product. Functions of the gift processing server 30 may be combined or shared with the functions of the gift redemption server 50. As will be appreciated by those skilled in the art, the system 20 described herein may be particularly advantageous in that it permits acceptance of gift values toward one or more gift products from multiple gift givers, the gift values being selectively usable at any selected retailer or retailers from among different retails.

A method aspect is directed to a method of redeeming a gift. The method includes using a gift redemption server 50' to obtain a redeemable gift value 49', a gift recipient identifier 36', and a gift discount identifier 55' from a gift processing server 30'. The gift processing server 30' is configured to accept the gift value for a gift product for a gift recipient, permit selection of a retailer 35a'-35n' from among a plurality of retailers for the gift product, and associate the gift recipient identifier 36' with the gift recipient. The gift processing server 30' is also configured to permit selection of a redeemable gift value 49' from the gift value 38', and generate the gift discount identifier 55' for use by the gift recipient at an online shopping platform 44' associated with the selected retailer 35a'-35n' of the gift product based upon the redeemable gift value 49' and the gift recipient identifier 36'. The method also includes using the gift redemption server 50' to cooperate, upon receipt of the gift discount identifier 55' from a retailer server 40', with the retailer server to apply the redeemable gift value 49' to the gift product at the online shopping platform 44' based upon the redeemable gift value 49' and the gift recipient identifier 36'.

A computer readable medium aspect is directed to a non-transitory computer readable medium for redeeming a gift. The non-transitory computer readable medium may include computer executable instructions that when executed by a processor 51' of a gift redemption server 50' cause the processor to perform operations. The operations include obtaining a redeemable gift value 49', a gift recipient identifier 36', and a gift discount identifier 55' from a gift processing server 30'. The gift processing server 30' is configured to accept the gift value for a gift product for a gift recipient, permit selection of a retailer 35a'-35n' from among a plurality of retailers for the gift product, and associate the gift recipient identifier 36' with the gift recipient. The gift processing server 30' is also configured to permit selection of a redeemable gift value 49' from the gift value, and generate the gift discount identifier 55' for use by the gift recipient at an online shopping platform 44' associated with the selected retailer 35a'-35n' of the gift product based upon the redeemable gift value and the gift recipient identifier 36'. The operations also include cooperating, upon receipt of the gift discount identifier 55' from a retailer server 40', with the retailer server to apply the redeemable gift value 49' to the gift product at the online shopping platform 44' based upon the redeemable gift value and the gift recipient identifier 36'.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A gift redemption system comprising:
    a gift processing server configured to
        accept a gift value for a gift product for a gift recipient, the gift product being associated with a brand,
        permit selection of a retailer from among a plurality of retailers for the gift product,
        associate a gift recipient identifier with the gift recipient, and
        permit selection of a redeemable gift value from the gift value;
    a retailer server associated with the selected retailer; and
    a gift redemption server configured to
        obtain the redeemable gift value and the gift recipient identifier,
        cooperate with said retailer server to generate a gift discount identifier for use by the gift recipient at a point-of-sale (POS) of the gift product based upon the redeemable gift value and the gift recipient identifier,
        generate a coupon redeemable toward a product of a same brand as the brand, the coupon having a redeemable value associated therewith, and set the redeemable value based upon a number of gift products of the same brand for which gift values are accepted so that the redeemable value of the coupon increases as the number of gift products of the same brand for which gift values are accepted also increases.

2. The gift redemption system of claim 1 wherein said gift redemption server is configured to generate the gift discount identifier based upon the gift product being purchased at the POS.

3. The gift redemption system of claim 1 wherein the gift product has a gift product identifier associated therewith; and wherein said gift redemption server is configured to cooperate with the POS to obtain a purchased product identifier and generate the gift discount identifier based upon a match between the gift product identifier and the purchased product identifier.

4. The gift redemption system of claim 3 wherein the gift product identifier and the purchased product identifier each comprises a uniform product code (UPC).

5. The gift redemption system of claim 1 further comprising a gift recipient device; and wherein said gift redemption server is configured to communicate the gift discount identifier to said gift recipient device.

6. The gift redemption system of claim 5 wherein said gift recipient device is configured to display the gift discount identifier thereon for input at the POS.

7. The gift redemption system of claim 5 wherein said gift recipient device comprises a mobile wireless communications device.

8. The gift redemption system of claim 1 wherein said gift redemption server is configured to cooperate with said retailer server to apply the redeemable gift value to a purchase price of the gift product based upon the gift discount identifier.

9. The gift redemption system of claim 1 wherein the gift discount identifier comprises a machine-readable code.

10. A gift redemption server comprising:
a processor and an associated memory configured to
obtain a redeemable gift value from a gift value and a gift recipient identifier from a gift processing server, the gift processing server configured to accept the gift value for a gift product for a gift recipient, the gift product being associated with a brand, permit selection of a retailer from among a plurality of retailers for the gift product, associate a gift recipient identifier with the gift recipient, and permit selection of the redeemable gift value from the gift value,
cooperate with a retailer server to generate a gift discount identifier for use by the gift recipient at a point-of-sale (POS) of the gift product based upon the redeemable gift value and the gift recipient identifier,
generate a coupon redeemable toward a product of a same brand as the brand, the coupon having a redeemable value associated therewith, and
set the redeemable value based upon a number of gift products of the same brand for which gift values are accepted so that the redeemable value of the coupon increases as the number of gift products of the same brand for which gift values are accepted also increases.

11. The gift redemption server of claim 10 wherein said processor is configured to generate the gift discount identifier based upon the gift product being purchased at the POS.

12. The gift redemption server of claim 10 wherein the gift product has a gift product identifier associated therewith; and wherein said processor is configured to cooperate with the POS to obtain a purchased product identifier and generate the gift discount identifier based upon a match between the gift product identifier and the purchased product identifier.

13. The gift redemption server of claim 10 wherein said processor is configured to cooperate with the retailer server to apply the redeemable gift value to a purchase price of the gift product based upon the gift discount identifier.

14. The gift redemption server of claim 10 wherein the gift discount identifier comprises a machine-readable code.

15. A method of redeeming a gift comprising:
using a gift redemption server to
obtain a redeemable gift value from a gift value and a gift recipient identifier from a gift processing server, the gift processing server configured to accept the gift value for a gift product for a gift recipient, the gift product being associated with a brand, permit selection of a retailer from among a plurality of retailers for the gift product, associate a gift recipient identifier with the gift recipient, and permit selection of the redeemable gift value from the gift value,
cooperate with a retailer server to generate a gift discount identifier for use by the gift recipient at a point-of-sale (POS) of the gift product based upon the redeemable gift value and the gift recipient identifier,
generate a coupon redeemable toward a product of a same brand as the brand, the coupon having a redeemable value associated therewith, and
set the redeemable value based upon a number of gift products of the same brand for which gift values are accepted so that the redeemable value of the coupon increases as the number of gift products of the same brand for which gift values are accepted also increases.

16. The method of claim 15 wherein using the gift redemption server comprises using the gift redemption server to generate the gift discount identifier based upon the gift product being purchased at the POS.

17. The method of claim 15 wherein the gift product has a gift product identifier associated therewith; and wherein using the gift redemption server comprises using the gift redemption server to cooperate with the POS to obtain a purchased product identifier, and generate the gift discount identifier based upon a match between the gift product identifier and the purchased product identifier.

18. The method of claim 15 wherein using the gift redemption server comprises using the gift redemption server to cooperate with the retailer server to apply the redeemable gift value to a purchase price of the gift product based upon the gift discount identifier.

19. A non-transitory computer readable medium for redeeming a gift, the non-transitory computer readable medium comprising computer executable instructions that when executed by a processor of a gift redemption server cause the processor to perform operations comprising:
obtaining a redeemable gift value from a gift value and a gift recipient identifier from a gift processing server, the gift processing server configured to accept the gift value for a gift product for a gift recipient, the gift product being associated with a brand, permit selection of a retailer from among a plurality of retailers for the gift product, associate a gift recipient identifier with the gift recipient, and permit selection of the redeemable gift value from the gift value;

cooperating with a retailer server to generate a gift discount identifier for use by the gift recipient at a point-of-sale (POS) of the gift product based upon the redeemable gift value and the gift recipient identifier;

generating a coupon redeemable toward a product of a same brand as the brand, the coupon having a redeemable value associated therewith; and setting the redeemable value based upon a number of gift products of the same brand for which gift values are accepted so that the redeemable value of the coupon increases as the number of gift products of the same brand for which gift values are accepted also increases.

20. The non-transitory computer readable medium of claim 19 wherein the operations comprise generating the gift discount identifier based upon the gift product being purchased at the POS.

21. The non-transitory computer readable medium of claim 19 wherein the gift product has a gift product identifier associated therewith; and wherein the operations comprise cooperating with the POS to obtain a purchased product identifier, and generating the gift discount identifier based upon a match between the gift product identifier and the purchased product identifier.

22. The non-transitory computer readable medium of claim 19 wherein the operations comprise cooperating with the retailer server to apply the redeemable gift value to a purchase price of the gift product based upon the gift discount identifier.

* * * * *